Patented Aug. 9, 1949

2,478,416

UNITED STATES PATENT OFFICE 2,478,416

POLYMERIZATION OF CROTYL METHACRYLATE

Henry Charles Miller, Claymont, Del., assignor to E. I. du Pont de Nemours & Company, Wilmington, Del., a corporation of Delaware No Drawing. Application May 2, 1945, Serial No. 591,633

1 Claim. (Cl. 260—89.5)

This invention relates to polymeric materials and more particularly to soluble polymers of diunsaturated esters.

The polymerization of compounds containing more than one double bond presents many difficulties in spite of the advances in polymerization technique. The polymerizations are frequently difficult to control on a large scale and the polymers obtained are seldom in a state convenient for fabrication into molded articles or coatings. Thus, while styrene forms a soluble polymer, divinylbenzene forms an insoluble polymer and even as little as 0.1 per cent of divinylbenzene in styrene yields an almost completely insoluble polymer. Similar effects on the solubility of styrene polymers are shown by divinyl sulfide and divinyl sulfone [Proc. Roy. Soc. (London) A163, 205 (1937)]. Methacrylic anhydride and ethylene dimethacrylate act in acrylate polymerizations as does divinylbenzene in styrene polymerizations [Gilman's Organic Chemistry (1943), p. 752]. Allyl, methallyl and methyl vinyl carbinyl esters of acrylyl- and methacrylyllactic acids form insoluble polymers and copolymerization thereof with methyl acrylate in ethyl acetate solution resulted in insoluble polymers and even as small a proportion as approximately 0.2 per cent of the bifunctional ingredient caused gellation [Modern Plastics (No. 19, 1944) 166].

This invention has as an object the provision of soluble polymers. A further object is the provision of a process whereby an ester of an unsaturated alcohol with an acid containing an acrylyl or methacrylyl group can be polymerized to a fusible soluble polymer. A further object is the provision of a process of obtaining soluble fusible polymers essentially free of unchanged monomer and capable of conversion to insoluble, infusible polymers. Another object is the provision of a process whereby soluble polymers are obtained in high yield. Other objects will appear hereinafter.

These objects are accomplished by the present invention wherein a crotyl ester of a monounsaturated organic acid containing an acryloxy group or an alpha substituted acryloxy group is polymerized in an aqueous medium containing a dissolved salt of persulfuric acid and, as a dispersing agent, a long chain alkyl sulfate or a long chain alkyl sulfonate. This process includes the polymerization of the crotyl ester of the unsaturated acid either alone or in admixture with other polymerizable unsaturated compounds.

The general procedure for practicing this invention is as follows:

An aqueous solution containing about 0.01 to 2% of a water-soluble salt of persulfuric acid, e. g. ammonium persulfate, about 0.05 to 5% of an alkali metal salt of a long chain alkyl sulfate or sulfonate and if desired, about 0.05 to 0.5% of an oxidizable sulfoxy compound, such as sodium bisulfite, is charged into a reaction vessel provided with means for efficient agitation. To this mixture is added the crotyl ester of the monounsaturated acid and the air in the free space above the liquid is then displaced by an inert gas such as nitrogen. The reaction vessel is then closed and the reaction mixture agitated to form an emulsion, then heated to an appropriate temperature within the range of 20 to 80° C. These conditions are maintained until polymerization is essentially complete which is usually less than 5 hours. The resulting dispersion is then transferred to a suitable open vessel and the polymeric materials coagulated by freezing or by the addition of an electrolyte. The coagulated product is then thoroughly washed to remove traces of impurities and residual dispersing agents and finally dried.

The more detailed practice of the invention is illustrated by the following examples wherein parts given are by weight. There are, of course, many forms of the invention other than these specific embodiments.

Example I

One hundred parts of crotyl methacryloxyacetate is emulsified in 200 parts of a solution containing 13.2 parts of a commercial dispersing agent having 22% of sodium cetylsulfate as the active ingredient and one part of ammonium persulfate and 0.2 part of sodium bisulfite. The reaction vessel is flushed with nitrogen and then closed. The vessel is heated at 60° C. with agitation for ½ hour. The reaction mixture is then cooled to room temperature and four parts of an aqueous dispersion containing one part of parahydroxydiphenyl dispersed in three parts of a 3.3% aqueous polyvinyl alcohol solution, is added to prevent oxidation of the polymer. The mixture is diluted with about twice its volume of water and frozen in a mixture of solid carbon dioxide and acetone. Upon melting a tough rubber-like polymer separates. It is freed from water-soluble impurities by milling with water. To remove alcohol-soluble impurities, the polymer is dissolved in acetone and precipitated by pouring into a large volume of methanol. Upon drying, 96 parts of a tough rubber-like polymer is obtained. The polymer dissolves readily in acetone to give a viscous solution which can be converted to a very hard insoluble nonthermoplastic material by heating at elevated temperatures for a short period.

When a reaction mixture containing 24 parts of crotyl methacryloxyacetate and 0.24 part of benzoyl peroxide dissolved in 76 parts of acetone was heated at 60° C., at 56.5% yield of soluble polymer was obtained at a point just short of gellation (8⅔ hrs.). Upon heating the solution for an additional ½ hr. an insoluble polymer was obtained. Thus a very considerably smaller yield of soluble polymer is obtained in a much longer time than when emulsion polymerization is employed. Furthermore, when a larger yield is sought an insoluble polymer is obtained.

Example II

One hundred parts of crotyl methacrylate is emulsified in 200 parts of a solution containing 13.2 parts of a commercial dispersing agent having 22% of sodium cetylsulfate as the active ingredient. To this emulsion is added one part of ammonium persulfate and 0.25 part of sodium bisulfite. The reaction vessel is flushed with nitrogen, closed and then heated at 60° C. for ¼ hour with efficient stirring. To the polymer emulsion thus obtained is added four parts of an aqueous dispersion containing 5% of phenyl-alpha-naphthylamine/diphenylamine, (55/45) to prevent oxidation of the polymer. The polymer dispersion is cooled, diluted with an equal volume of water and coagulated by freezing in a mixture of solid carbon dioxide and acetone. Upon melting, a rubbery polymer separates which is washed free of water-soluble impurities by milling in a stream of water at 50° C. on a corrugated rubber mill. The polymer is then dried. There is thus obtained 73.5 parts of a polymer which is soluble in butyl acetate, acetone or a mixture of xylene and methanol containing 2% of methanol. Films cast from these solutions and baked at elevated temperatures are hard, colorless, infusible and insoluble.

When a reaction mixture containing 24 parts of crotyl methacrylate and 0.24 part of benzoyl peroxide dissolved in 76 parts of acetone, is heated at approximately 60° C. to a point just short of gellation (5½ hours) there is obtained a 31.8% yield of soluble polymer. Upon heating the solution for an additional ¾ hr. an insoluble and infusible polymer is obtained.

When allyl methacrylate is polymerized in an aqueous emulsion under the conditions described above, there is obtained a 90% yield of polymer but the polymer is insoluble, e. g., in acetone, xylene and xylene-methanol mixtures.

Example III

To 300 parts of a solution containing 20 parts of a dispersing agent having 22% of a sodium cetylsulfate as the active ingredient, are added 180 parts of crotyl methacryloxyacetate and 1.80 parts of ammonium persulfate. The reaction vessel is flushed with nitrogen and the mixture, after vigorous shaking to create an emulsion, is heated at 55° C. for 2 hrs. To the polymer dispersion obtained is added 20 parts of an aqueous dispersion containing 5 parts of parahydroxydiphenyl dispersed in 15 parts of a 3.3% aqueous polyvinyl alcohol solution to prevent oxidation of the polymer. The polymer dispersion is then diluted with an equal volume of water and coagulated by freezing in a mixture of solid carbon dioxide and acetone. Upon melting, a rubbery polymer separates which is washed in warm water for 20 minutes on a corrugated rubber mill. The polymer is then dried and weighed (yield 150 parts). The polymer is completely soluble in a mixture of 97 parts of xylene and 3 parts of n-butanol. Films cast from this solution and baked at elevated temperatures are hard, colorless, insoluble and infusible.

Example IV

To 300 parts of a solution containing 20 parts of a dispersing agent having 22% of sodium cetylsulfate as the active ingredient are added 75 parts of crotyl methacryloxyacetate, 75 parts of styrene, 1.5 parts of ammonium persulfate and 0.3 part of sodium bisulfite. The reaction vessel is flushed with nitrogen and the mixture is heated to 60° C. After ½ hr. at this temperature the dispersion is diluted with an equal volume of water and frozen to precipitate the polymer. Upon melting a rubbery polymer is obtained which is washed free of water-soluble impurities by milling in a stream of water on a corrugated rubber mill. After drying, the polymer weighs 145 parts and is soluble in xylene and butyl acetate. Insoluble, tough coatings are obtained on baking 45 min. at 150° C. films cast from the solution of the polymer containing 1% benzoyl peroxide based on the polymer.

Example V

To 300 parts of a solution containing 20 parts of a commercial dispersing agent having 22% of sodium cetylsulfate as the active ingredient are added 75 parts of crotyl methacryloxyacetate, 75 parts of methyl methacrylate, 1.5 parts of ammonium persulfate and 0.3 part of sodium bisulfite. The reaction vessel is flushed with nitrogen, closed and vigorously shaken to emulsify the mixture of monomers. The reaction vessel is then heated with shaking at 60° C. for ½ hr. The dispersion is then diluted with an equal volume of water and then frozen to precipitate the polymer. Upon melting a granular polymer is obtained which is washed free of water-soluble impurities by vigorous stirring with water. After drying, there is obtained 110 parts of a polymer which is soluble in xylene/methanol mixtures and butyl acetate. Insoluble coatings are obtained on baking for 45 min. at 150° C. films cast from a xylene/methanol solution of the polymer containing 1% benzoyl peroxide based on the polymer.

This invention contemplates the production of soluble, fusible, polymeric products from crotyl esters of unsaturated acids containing a

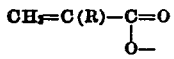

radical, wherein R is hydrogen, halogen (preferably chlorine), or hydrocarbon (preferably methyl). These polymeric esters are further characterized by the ability to undergo further polymerization to yield insoluble, infusible polymeric products. Representative compounds of this class include the crotyl esters of acrylic and alpha-substituted acrylic acids such as methacrylic, alpha-chloroacrylic, alpha-phenylacrylic acids and the corresponding acrylyl and alpha-substituted acrylyl alpha-oxycarboxylic acids, such as crotyl acryloxyacetate, crotyl alpha-methacryloxypropionate and crotyl alpha-phenylacrylyl alpha-oxyisobutyrate.

The crotyl esters which the process of this invention polymerizes are therefore of the formula

wherein R$_a$ is hydrogen, halogen (preferably chlorine), or hydrocarbon (preferably methyl), $R_b$ and $R_c$ are hydrogen or methyl (preferably hydrogen) and $n$ is 0 or 1. The crotyl esters may also be described as having terminally one crotyl

—CH$_2$—CH=CH—CH$_3$ radical and one CH$_2$=CR$_a$·CO·O— radical wherein $R_a$ is as above, any radical separating said two radicals being a —CR$_b$R$_c$·CO·O— radical wherein $R_b$ and $R_c$ are as above, the free valence from the carboxyl is satisfied by the above crotyl and the free valence from the —CR$_b$R$_c$ is satisfied by the above arcylyl radical. The crotyl esters as defined above may be polymerized alone, in admixture with one or more additional crotyl esters as above defined or in admixture with one or more polymerizable organic compounds containing a single ethylenic linkage, preferably polymerizable monounsaturated compounds having a CH$_2$=C= group.

Representative compounds of this class include acrylic and methacrylic esters such as methyl methacrylate, ethyl methacrylate, acrylonitrile, methacrylonitrile, styrene, chlorostyrene, vinyl chloride, vinyl bromide, vinylidene chloride, vinyl acetate and vinyl esters of higher carboxylic acids.

In preparing the copolymers according to this invention the proportion of the crotyl ester of the unsaturated acid in the monomer mixture may be varied from 1 to 99%. In general, 5% is about the smallest quantity of the di-unsaturated ester which is capable of bringing about appreciable modification of the polymers obtained from monoethylenically unsaturated compounds. For most purposes the monomer mixture should contain a major proportion of the crotyl ester of the unsaturated acid.

Although in the foregoing examples certain definite conditions of temperature, pressure, monomer/water ratios, catalyst concentrations, etc., have been referred to, it is to be understood that these ratios can be varied widely within the limits of this invention. Practically speaking, it is preferable to utilize mixtures in which the ratio of the aqueous to nonaqueous phase is between approximately 10:1 and 1:1. In large scale operation ratios between 4:1 and 1:1 will be found suitable.

The polymerization catalysts employed in this invention are the water-soluble salts of persulfuric acid. In addition to the ammonium salts disclosed in the examples, there may also be used the alkali metal salts such as sodium and potassium persulfates. The concentration of the catalyst employed may be varied from 0.01 to 10% of a quantity of monomer employed.

Sodium cetylsulfate is disclosed as the dispersing agent in the foregoing examples but any alkali metal salt of a long chain alkyl sulfate or sulfonate containing from 12 to 18 carbon atoms in the hydrocarbon portion of the molecule can be employed. Thus the sodium and potassium salts of dodecylsulfuric acid, octadecylsulfuric acid, dodecanesulfonic acid, hexadecanesulfonic acid, and octadecanesulfonic acid may be employed. By the use of such dispersing agents, the process of this invention can be conducted at pH values ranging from 1 to 11. In general, pH values of 3 to 5 are used.

The action of the water soluble persulfate catalyst may be markedly improved by the use therewith of an oxidizable sulfur compound, i. e. a water soluble inorganic compound containing both sulfur and oxygen and in which the sulfur has a valence no greater than four, i. e. sulfur dioxide and compounds containing a sulfur oxygen linkage and yielding sulfur dioxide on treatment with hydrochloric acid. While sodium bisulfite is preferred other such compounds, e. g. sodium sulfite, ammonium bisulfite, sodium hydrosulfite, sodium thiosulfate, formamidinesulfinic acid, condensation products of aldehydes with alkali metal bisulfites or hydrosulfites and dialkyl sulfites may be used. The amount of the oxidizable sulfoxy compound to be added to the dispersions may vary from 0.001 to 5% based on the weight of the monomer. For most purposes an amount between 0.01 and 4% can be conveniently employed. Generally speaking the use of the combination initiator system, that is, the water-soluble persulfate catalyst in combination with the oxidizable sulfoxy compounds, represents an outstanding advance over older methods described in the prior art. By using this improved initiator system, the polymerization can be carried out in a much shorter time than with the persulfate catalyst alone. For this reason it is possible to carry out the polymerization of the diunsaturated compounds to soluble polymers at temperatures much below those commonly used in the prior art processes. The operative temperatures include temperatures ranging from 0 to approximately 100° C. In general, however, temperatures within the range of 20 to 80° C. are employed.

The products prepared according to the present invention may be used for the preparation of plastics, coatings, films, foils and adhesives. The products obtained are particularly suitable for the preparation of insoluble and infusible coatings and films. For many of these purposes, the polymer may be combined with or prepared in the presence of plasticizers, stabilizers, fillers, pigments, dyes, softeners, natural resins or other synthetic resins.

The above description and examples are intended to be illustrative only. Any modification thereof or variation therefrom which conforms to the spirit of the invention is intended to be included within the scope of the claim.

What is claimed is:

A process for preparing a soluble, fusible polymer of crotyl methacrylate which comprises maintaining, at 0–100° C. until polymerization is substantially complete, an aqueous emulsion of crotyl methacrylate monomer containing 0.01 to 2% of a water soluble persulfate and 0.05 to 0.5% of a water soluble compound of oxygen and sulfur in which the sulfur has a valence no greater than four as the polymerization catalyst combination and, as a dispersing agent, an alkali metal salt of an organic acid of the class consisting of alkylsulfuric acids and alkanesulfonic acids having 12 to 18 carbon chain.

HENRY CHARLES MILLER.

REFERENCES CITED

The following references are of record in the file of this patent:

UNITED STATES PATENTS

| Number | Name | Date |
|---|---|---|
| 2,097,263 | Strain | Oct. 26, 1937 |
| 2,129,665 | Barrett et al. | Sept. 13, 1938 |
| 2,141,546 | Strain | Dec. 1938 |
| 2,271,384 | Arnold | Jan. 27, 1942 |
| 2,348,154 | Scott | May 2, 1944 |